United States Patent Office 2,802,834
Patented Aug. 13, 1957

2,802,834

3-TETRAHYDROFURFURYLOXYPHTHALIDE

Donald D. Wheeler and David C. Young, Midland, Mich., assignors to The Dow Chemical Company, Midland, Mich., a corporation of Delaware No Drawing. Application April 30, 1956,
Serial No. 581,351

1 Claim. (Cl. 260—343.3)

This invention is directed to 3-tetrahydrofurfuryloxyphthalide having the structure

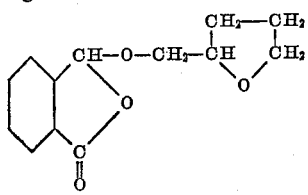

This new compound is an amber-colored liquid, soluble in organic solvents such as benzene and acetone, and substantially insoluble in water. It is valuable as a germicide and is adapted to be used for the control of bacterial organisms.

The compound of this invention is conveniently prepared by causing phthalaldehydic acid to react with tetrahydrofurfuryl alcohol. The terms "phthalaldehydic acid" and "3-hydroxyphthalide" refer to a compound having the structure

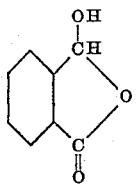

Phthalaldehydic acid is often represented in the literature as having the structure

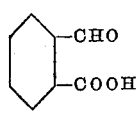

However, the acid employed in this invention and prepared as hereinafter described exists almost entirely in the closed ring, 3-hydroxyphthalide structure, as observed from a study of its infrared absorption spectrum. The infrared spectrum supports the closed ring 3-tetrahydrofurfuryloxyphthalide structure for the product.

In a preferred method for carrying out the reaction phthalaldehydic acid and tetrahydrofurfuryl alcohol are mixed and heated in the temperature range of from 90° to 120° C. The reaction takes place with the formation of 3-tetrahydrofurfuryloxyphthalide product and water of reaction. The latter begins to reflux during the heating period and the mixture is thereafter maintained under reflux for one to five hours. On completion of the heating, the reaction mixture is poured into water forming a heterogeneous mixture which separates into an aqueous phase and an organic product phase. The aqueous phase is decanted from the organic product and the latter dissolved in benzene. The benzene solution is heated to distill benzene and water and to obtain the desired product as residue.

In a representative operation, 30.6 grams (0.3 mole) of tetrahydrofurfuryl alcohol and 45.0 grams (0.3 mole) of phthalaldehydic acid were mixed and heated at 120° C. under reflux for five hours. The mixture was cooled to 80° C. and poured into 600 milliliters of water whereupon an oil precipitated. The water was decanted from the oil and the latter dissolved in benzene. The benzene solution was heated to remove first the water as a benzene-water azeotrope and then the benzene, and to obtain as residue a 3-tetrahydrofurfuryloxyphthalide product. The latter was an amber-colored oil having a refractive index $n_D^{25}$ of 1.5439. The yield of the product was 44 grams or 63 percent of theoretical.

The novel compound of the present invention is useful as a germicide and may be employed for the control of bacterial organisms. In a representative operation, a solid nutrient agar medium saturated with 3-tetrahydrofurfuryloxyphthalide was streaked with *Staphylococcus aureus* and incubated at 30° C. for three days. At the end of this period, complete inhibition of the test organism was observed.

The phthalaldehydic acid employed in this invention may be prepared by photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene is then heated with aqueous constant-boiling hydrochloric acid containing 10 percent ferric chloride solution to obtain phthalaldehydic acid, as more fully disclosed and claimed in a copending application of James D. Head and Owen D. Ivins, Serial Number 279,682, filed March 31, 1952, now Patent No. 2,748,162.

We claim:
3-tetrahydrofurfuryloxyphthalide.

References Cited in the file of this patent

Grove: Biochem. J. 54, pp. 664–673 (1953).
Auwers et al.: Berichte 52, pp. 587, 596 (1919).
Kohlrausch et al.: Berichte 77, p. 471 (1944).
Racine: Annalen 239, p. 83 (1887).